March 8, 1966     L. L. PITNEY     3,239,273
LAP BELT TIGHTENER
Filed June 19, 1964

INVENTOR.
LENNORD L. PITNEY

United States Patent Office 3,239,273
Patented Mar. 8, 1966

3,239,273
LAP BELT TIGHTENER
Lennord L. Pitney, Levittown, Pa., assignor to the United States of America as represented by the Secretary of the Army
Filed June 19, 1964, Ser. No. 376,594
2 Claims. (Cl. 297—385)
(Granted under Title 35, U.S. Code (1952), sec. 266)

The invention described herein may be manufactured and used by or for the Government for governmental purposes without the payment to me of any royalty thereon.

This invention relates to a means for tightening a lap belt on aircraft and has for an object to effect suitable tightening quickly and easily without danger of the same being too tight. Another object is to enable such to be effective with minimum change in existing equipment.

Seat lap belts for use in aircraft are functionally different in some regards and have different requirements from those used in automobiles. At the time of ejection by a catapult actuated seat, there is a need for the belt to be tighter than is ordinarily required for normal operation or for landing, and tighter than is required for a seat belt used in an automobile, to insure that the passenger or occupant is physically positioned against the ejected seat so that the ejection operation may be safely fulfilled. For this reason a seat lap belt used in an aircraft needs to be suddenly and easily tightened a prescribed amount with minimum effort while fulfilling this requirement with minimum change in the existing equipment.

Figure 2:
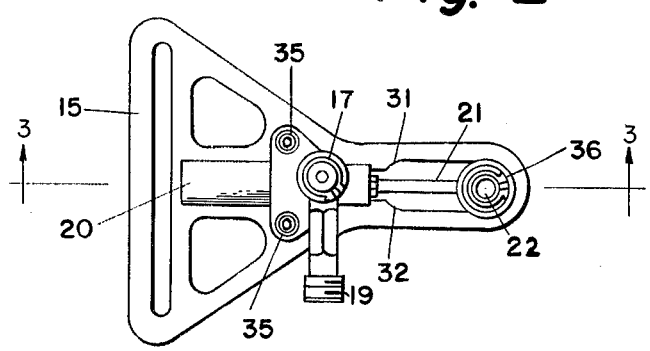
FIG. 2 is a plan view of an anchor loop to which the fluid pressure motor is attached.
Figure 3:
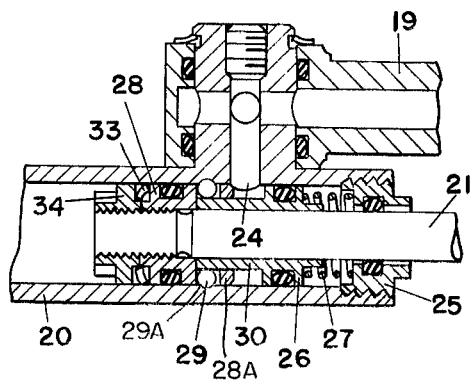

FIG. 3 is a partial sectional view taken along line 3—3 of FIG. 2 with hose connection 19 having been turned 90° counter-clockwise for clarification purposes.

An ejection seat 10 for ejecting personnel from an aircraft is represented without any portion of the ejecting means (catapult or rocket motor) being illustrated since it is not a part of this invention. A short time response initiator 11 containing an appropriate propellant such as black powder is fired in any convenient manner, electrically or by percussion, and manually or automatically. The seat belt 12 is usually of web type material about 3 inches wide. Some usual locking and unlocking mechanism such as a buckle 13 or clasp enables the belt to be quickly fastened or unfastened while the ends are fastened to the seat or its frame. Since personnel are oftentimes different in size or contour, some usual form of adjusting buckle or means 14 akin to that used with pants suspenders or the like is found convenient. An anchor loop 15 shown more clearly in FIG. 2 carries a motor 17 for tightening the belt 12 quickly. A similar anchor loop 15 and motor 17 is placed on the opposite side or end of the belt. Each loop 15 is firmly attached to a fixed support 16 on the seat. By this arrangement each motor contributes about half the shortening or tightening effect of the belt. The motor is constructed so that it will shorten the belt on each side by about one inch under a pressure of not more than about 35 to 50 pounds.

Figure 1:
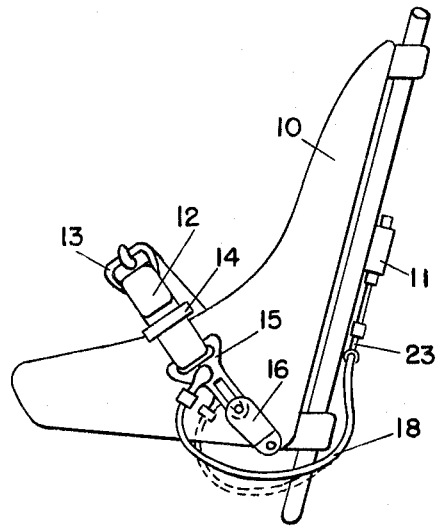
FIG. 1 shows a representation of an aircraft ejection seat.

In FIG. 1 a flexible hose 18 is connected between the initiator 11 and the motor 17 (FIG. 2) on each side of the seat 10, one side being the duplicate of the other side. A swivel type hose connection 19 (FIG. 2) is provided as part of the motor 17 and communicatively interconnects the interior of cylinder 20 with hose 18. Upon firing the propellant in the initiator 11, pressure causes relative motion between the motor shaft 21 or its integral piston 28 and the cylinder 20 to tighten the belt as will be hereinafter described.

Each hose has one end thereof joined to the initiator 11 through a T-connector 23, the other hose ends being connected to the corresponding connector 19. Gas pressure generated by the initiator 11 passes through each hose 18 and enters an admission port 24 leading into the respective cylinder 20. Gas pressure moves O-ring retainer 26 to the right (FIG. 3) compressing the coil spring 27 against an end wall 25 threaded into the cylinder 20. As retainer 26 moves to the right, its integral sleeve 30 also moves a short distance to the right to uncover or unlock balls 29 which previously had been locked or seated in their locking groove 29A formed in the cylinder internal wall between piston portion 28 and 28A which are interconnected by means not shown.

The uncovered balls 29 are thus freed from their locking groove 29A, and relative movement between cylinder 20 and its piston 28 and fixed end 21 is no longer restricted. Since shaft 21 and piston 28 are attached to a fixed pin connection 22, the cylinder 20 as well as the loop 15 are thus moved to the right to draw the belt tighter. This apparatus and the quantity of propellant used are so proportioned that the anchor loop 15 cannot move more than about one inch or until its bifurcated stop portions 31, 32 abut the pin and ring connection 22. It is contemplated that a sufficiently generated gas pressure in the system will produce a predetermined load on each belt end such that the resultant pressure by the belt upon a seat-occupant will not exceed about 35 to 50 pounds, regardless of the amount of anchor loop travel before the apparatus reaches a lock position. The locking or bent spring washer 33 acts as a stop permitting movement of the cylinder 20 to the right on shaft 21 but not motion in an opposite direction.

After the ejected seat has been recovered, the motor 17 may be disconnected from the anchor loop 15 by removing the bolts 35 and the snap ring 36 from the connection 22. The piston 28 and shaft 21 may be moved out of the open left end of the cylinder 20, and the jam nut 34 and the flexible spring stop washer 33 removed for reassembly and subsequent use of the entire belt tightening apparatus.

All that is necessary for retrofitting existing aircraft seat belt systems is the substitution of an improved anchor loop structure constructed in accordance with the present invention.

For reasons of comfort a seat lap belt is normally worn loosely by an airborne occupant or passenger. This condition, however, is dangerous during the ejection operation since the possibility exists of the passenger or occupant sliding downwardly or being moved partially out of the seat, thus subjecting his legs to possible interference with the surrounding portion of the aircraft. The belt tightening apparatus of this invention as herein described has the effect of automatically and rapidly tightening the seat lap belt to insure that the passenger in the seat will not be adversely moved during the ejection operation. Firing of the initiator 11 by the passenger or some crew member or by automatic means not shown commences the belt tightening operation. It is contemplated that the belt tightening apparatus may be used in conjunction with a shoulder harness device normally employed to pre-position an occupant in the seat prior to occupant-seat ejection.

I claim:

1. The combination with an aircraft seat belt, of an anchor loop secured thereto, and a fluid pressure motor secured to said anchor loop for tightening said seat belt in response to firing an initiator adjacent thereto, said initiator connected with said motor by tubing, said motor comprising a shaft connected with a support to which an end of said anchor loop is secured, a combination sleeve and retainer wall on said shaft, a cylinder around said shaft, an end of said cylinder toward said support having an end wall through which said shaft is slidable, said cylinder being provided with an inlet port for fluid pressure, a spring between said end wall and retainer wall, a piston fixed to said shaft on a side of said inlet port opposite said retainer wall, and a ball lock normally secured by said sleeve and holding said piston and cylinder against relative movement until said initiator has been fired, whereby on the admission of fluid under pressure to said cylinder through said port, said retainer wall is moved toward said end wall compressing said spring and moving said sleeve out of contact with said ball lock to release said piston and cylinder for relative movement and enable a tightening movement of said anchor loop.

2. A combination according to claim 1 in which said piston carries a flexed stop washer mounted to allow movement of said shaft only in one direction.

References Cited by the Examiner
UNITED STATES PATENTS

| | | | |
|---|---|---|---|
| 2,568,228 | 9/1951 | Forse | 92—117 X |
| 2,955,786 | 10/1960 | Drew et al. | 244—122 |
| 3,077,324 | 2/1963 | Strickland | 297—385 X |
| 3,185,148 | 5/1965 | Gaylord | 244—122 X |

FOREIGN PATENTS

| | | |
|---|---|---|
| 1,258,697 | 3/1961 | France. |
| 1,354,178 | 1/1964 | France. |

FRANK B. SHERRY, *Primary Examiner.*

R. B. FARLEY, *Assistant Examiner.*